(12) United States Patent
Villaret

(10) Patent No.: US 9,007,057 B2
(45) Date of Patent: Apr. 14, 2015

(54) HIGH RESOLUTION ABSOLUTE ENCODER

(75) Inventor: Yves Villaret, Hadera (IL)

(73) Assignee: Servosence (SMC) Ltd., Petach-Tikva (IL)

( * ) Notice: Subject to any disclaimer, the term of this patent is extended or adjusted under 35 U.S.C. 154(b) by 0 days.

(21) Appl. No.: 14/369,730

(22) PCT Filed: Apr. 30, 2012

(86) PCT No.: PCT/IL2012/000172
§ 371 (c)(1),
(2), (4) Date: Nov. 19, 2014

(87) PCT Pub. No.: WO2013/098803
PCT Pub. Date: Jul. 4, 2013

(65) Prior Publication Data
US 2015/0070001 A1    Mar. 12, 2015

Related U.S. Application Data

(60) Provisional application No. 61/580,668, filed on Dec. 28, 2011.

(51) Int. Cl.
*G01D 5/12* (2006.01)
*G01D 5/14* (2006.01)
*G01D 5/244* (2006.01)

(52) U.S. Cl.
CPC ............ *G01D 5/145* (2013.01); *G01D 5/24476* (2013.01)

(58) Field of Classification Search
CPC .............. G01D 5/145; G01D 5/24452; G01D 5/24476; G01D 5/2448; G01D 5/2449; G01D 5/2492; G01D 5/3473

USPC ................ 324/200–263; 250/231.13, 231.14, 250/231.18; 341/9, 10, 13, 15
See application file for complete search history.

(56) References Cited

U.S. PATENT DOCUMENTS 4,414,754 A  *  11/1983  Lapeyre ...................... 33/363 K
4,998,105 A     3/1991  Takekoshi et al.
(Continued)

FOREIGN PATENT DOCUMENTS

WO    WO 2013/098803    7/2013

OTHER PUBLICATIONS

International Preliminary Report on Patentability Dated Jun. 18, 2014 From the International Bureau of WIPO Re. Application No. PCT/IL2012/000172.
(Continued)

*Primary Examiner* — Huy Q Phan
*Assistant Examiner* — James Split

(57) ABSTRACT

The device to measure the absolute rotation angle of a rotating shaft includes a rotating disc, fixed to the shaft. A group of permanent magnets of different sizes and polarities is disposed on a circular track. Further, a group of Hall sensors, fixed to a static part of the device, are disposed on a circular path, in proximity of the rotating disc magnets tracks, and generate electric signals proportional to the strength of the magnetic field produced by the magnets in proximity. The signs of these electric signals are used to calculate a code characteristic of a low resolution absolute angular position. Two analog signals are associated to the obtained code, according to a predefined table. The associated analog signal having the closest value to zero is used as an entry to a pre-recorded table containing the correspondent angular position of the shaft.

11 Claims, 9 Drawing Sheets

(56) References Cited

U.S. PATENT DOCUMENTS

| | | |
|---|---|---|
| 5,004,910 A | 4/1991 | Arnett |
| 5,029,304 A | 7/1991 | Tolmie, Jr. |
| 5,519,393 A * | 5/1996 | Brandestini .................... 341/10 |
| 5,852,413 A * | 12/1998 | Bacchi et al. .................... 341/13 |
| 5,880,683 A | 3/1999 | Brandestini |
| 5,905,350 A * | 5/1999 | Hofbauer et al. ............. 318/601 |
| 6,111,402 A | 8/2000 | Fischer |
| 7,091,883 B2 | 8/2006 | Kunow et al. |
| 7,902,493 B2 * | 3/2011 | Backes .................... 250/231.13 |
| 2010/0140463 A1 * | 6/2010 | Villaret .................... 250/231.14 |
| 2011/0187355 A1 | 8/2011 | Dixon et al. |

OTHER PUBLICATIONS

International Search Report and the Written Opinion Dated Nov. 8, 2012 From the International Searching Authority Re. Application No. PCT/IL2012/000172.

* cited by examiner

| Code | CCW zero crossing sensor number | CW sensor zero crossing sensor number | CCW Sensor Function pointer | CW Sensor Function pointer |
|---|---|---|---|---|
| 1 | 3 | 2 | Pt1_1 | Pt2_1 |
| 2 | 4 | 3 | Pt1_2 | Pt2_2 |
| 3 | 2 | 4 | Pt1_3 | Pt2_3 |
| 4 | 5 | 4 | Pt1_4 | Pt2_4 |
| 5 | 5 | 3 | Pt1_5 | Pt2_5 |
| 6 | 3 | 5 | Pt1_6 | Pt2_6 |
| 8 | 1 | 5 | Pt1_7 | Pt2_7 |
| 9 | 3 | 1 | Pt1_8 | Pt2_8 |
| 10 | 1 | 4 | Pt1_9 | Pt2_9 |
| 11 | 4 | 1 | Pt1_10 | Pt2_10 |
| 12 | 4 | 1 | Pt1_11 | Pt2_11 |
| 13 | 1 | 3 | Pt1_12 | Pt2_12 |
| 16 | 2 | 1 | Pt1_13 | Pt2_13 |
| 17 | 1 | 3 | Pt1_14 | Pt2_14 |
| 18 | 4 | 2 | Pt1_15 | Pt2_15 |
| 20 | 2 | 5 | Pt1_16 | Pt2_16 |
| 21 | 3 | 5 | Pt1_17 | Pt2_17 |
| 22 | 5 | 2 | Pt1_18 | Pt2_18 |
| 24 | 5 | 2 | Pt1_19 | Pt2_19 |
| 26 | 2 | 4 | Pt1_20 | Pt2_20 |

802

| Sensor Number | Hn | Ln |
|---|---|---|
| 1 | (value) | (value) |
| 2 | (value) | (value) |
| 3 | (value) | (value) |
| 4 | (value) | (value) |
| 5 | (value) | (value) |

HIGH RESOLUTION ABSOLUTE ENCODER

CROSS REFERENCE TO RELATED APPLICATIONS

This application is a National Phase of PCT Patent Application No. PCT/IL2012/000172 having International filing date of Apr. 30, 2012, which claims the benefit of priority under 35 USC §119(e) of U.S. Provisional Patent Application No. 61/580,668, filed on Dec. 28, 2011. The contents of the above applications are all incorporated herein by reference as if fully set forth herein in their entirety.

FIELD OF THE INVENTION

The present invention relates to devices for determining the amount of displacement and the position of a moving body and, in particular, to encoder devices (encoders).

BACKGROUND OF THE INVENTION

Encoders are used to measure the angular position of a rotating element, or the relative displacement of sliding elements. They are typically used in control systems, often referred to as servo systems, where a motion controller is used to make a moving element follow a precise desired path. For that purpose, encoder devices include an electronic interface which allows their connection to a motion controller.

Encoders may be of two types, rotary and linear. Rotary encoders are designed to measure the angular position of a rotary element, like the shaft of a motor or any rotating device. Linear encoders are designed to measure the relative movement of two sliding elements, for example a sliding carriage mounted on a linear bearing relative to a static base.

In a common application, a rotary encoder is mounted on an electrical motor shaft at the rear end, and provides position information about the shaft rotation angle to the electric motor controller. The motor controller will then output an appropriate current to the motor in order to make it rotate toward the desired position.

In another common application, a linear encoder is mounted on the moving element of a linear motor, and is connected to the linear motor motion controller.

Throughout this patent application, the term "encoder device" shall refer to both a rotary encoder and to a linear encoder.

In automatic machinery, it is often required that moving elements will follow a path with very high precision and at high speeds. To achieve this, the encoder device should have a high precision, and should be able to transfer position information at a high rate. As an example, commercially available rotary encoders can provide precision better than 0.01 degrees when the rate of transfer of the rotation angle data to a motion controller is typically between 8,000 to 30,000 data transfers per second.

Another quality required from an encoder device is its resolution. The resolution represents the number of positions that the encoder device is able to measure in one revolution or in one unit of length. The resolution is usually higher than the precision, meaning that the encoder device is able to provide position data having more significant digits than required for the precision, even if the position value output differs from the actual position by some error, this error being inferior to that defined by the precision characteristic of the encoder. High resolution allows motion controllers, also called servo controllers, to achieve a tight and smooth control of the moving elements.

Encoder devices may be absolute or incremental. An absolute encoder device is able to measure the angular or linear position relative to a fixed reference position, while an incremental encoder device is capable of measuring the angular or linear displacement from the start of its operation. Thus, when an incremental encoder device is used in the automatic machinery, it is common to execute, at each start of operation of the machine, a search for a reference position. This search is done at a slow speed in a given direction, until a limit switch, or other device placed at the reference position, is activated. This search procedure adds complexity to the system, and delays the first operation of the machine. In spite of this drawback, incremental encoders are commonly used, due to their simplicity and their low cost. In many cases, a machine builder would have preferred to use an absolute encoder, but makes use of an incremental encoder due to the higher cost of presently available absolute encoders.

The absolute resolution of an absolute encoder device is limited by the number of sensors. An encoder using a number n of sensors can have a maximum absolute resolution of $2^n$. For example, an 8 sensor rotary encoder cannot provide absolute resolution of 256. In order to obtain a higher resolution, absolute encoder devices are usually combined with a high resolution incremental encoder device in order to provide a high absolute resolution encoder device. This results in higher complexity, size and cost of the device.

It is thus desirable to provide an absolute encoder device, which is of simple fabrication and still provides high precision and resolution at a lower cost.

In Villaret (USA Published Patent Application 2010/0140463), there is described an absolute encoder device of simple construction, that can provide absolute position information. The device makes use of a number of sensors, equally distributed on a circumference of a static part. A rotating disc, having sections of alternating properties on an annular track, is placed so that the sensors can sense the property of the section of track in proximity. During disc rotation, different sections of the rotating disc come into proximity to each sensor. Each sensor electrical signal is digitized to provide a bit value 1 or 0. Bit values of all sensors are then combined in a digital word to create a unique code value for each rotating disc angular range position. An advantage of Villaret is the simplicity of the device. Since sensors are equally distributed on a circular line, distance between sensors is relatively large and commercially available sensors of normal size can be used.

In the herein patent application, the absolute resolution or N is the number of code values generated while rotating the encoder disc by a full turn. The "Sectors" are defined as being angular portions of equal size of an encoder rotating disc circular track. The number of sectors is equal to N, the encoder absolute resolution. Each sector of the said track is made of material having a first or a second property, according to a predefined pattern.

The encoders include sensors that are placed in proximity of the disc circular track and are sensible to the property of the closest sector of the track. For example, many optical encoders have a circular track including transparent and opaque sectors. A light emitter is placed on one side of the rotating disc, and the light sensors are placed on the other side, so that light passing through the transparent sectors is sensed by the light sensors. Whenever light is sensed by a sensor, this sensor outputs a signal represented by the digital value 1, indicating a transparent sector; and, whenever there is no light sensed, the sensor will output a signal represented by the digital value 0.

For purposes of understanding the prior art, a prior art encoder embodiment with a relative low resolution is described. For these descriptions, particular values of the number of sectors N and the number of sensors S are used. It must be understood that other values of N and S can be used.

Ohno (U.S. Pat. No. 5,068,529) describes an absolute encoder using a first patterned track to measuring incremental position, and a second patterned track to measure absolute position.

In FIG. 1 herein, there is shown an encoder built according to a first prior art embodiment, providing an absolute position resolution of 32. A rotating disc 101 is mounted on a rotating shaft 102, and includes a circular track indicated by the dashed line 107. The circular track 107 is composed of a number N=32 of sectors, for example 103, all of equal size. Each sector has a first or second property according to a defined pattern. For example, a sector of first property may be transparent, and a sector of second property may be opaque.

A number S=5 of sensors, 105a-105e, are fixed and disposed on a circular path in proximity to the rotating disc circular track, so that sensors 105a-105e sense the property of the closest sector and output S digital signals b0-b4, representing values 0 or 1 according to the closest sector property. These S digital signals are then combined in one digital word 106, whose value is characteristic of the angular position of the rotating disc 101.

According to this patent application, in order to indicate the angular position of the rotating disc, the term "sector position" is used. The rotating disc is in a sector position p when the rotating disc is in an angular position such that sector number p of the rotating disc circular track 101 is the closest to a reference sensor, for example sensor 105a. There are thus N possible sector positions for the rotating disc.

The pattern of properties of the sectors is designed so that each value of the word 106 obtained at a given sector position is never obtained at a different sector position of the rotating disc. Nagase (U.S. Pat. No. 5,117,105) describes a method to design such a pattern.

A first drawback of this prior art embodiment is the requirement that the sensors used to measure the absolute position must be placed at angular distances equal to a sector's angular size. This requires that the sensors should be of a smaller size than a sector. For example, if the rotating disc diameter is 30 mm and the absolute resolution required is 256, each sensor should be smaller than 0.36 mm. In that case commercially available sensors cannot be used, and custom sensors, integrated on one chip, must be used.

Typically, this can be done using optical sensing devices, where several sensors are implemented on one semiconductor device. This implementation is not practical, due to the high cost and the lack of modularity. For each encoder size, a different integrated device should be designed. If magnetic sensors are considered, the design of small size integrated device is even more complex and expensive.

A second drawback of this prior art embodiment is the fact that resolution is limited. Due to practical considerations on the size of the sensors and the size of the sectors, the number of sectors is limited, and thus also the encoder resolution. Whenever high resolution is required, the absolute encoder is typically combined with an incremental encoder, as described for example in Imai (U.S. Pat. No. 5,252,825). This results in increased complexity and cost of the encoder.

Villaret (US Published Patent Application US2010/0140463) provides an improvement that eliminates the first above-mentioned drawback. Referring to FIG. 2 herein, according to Villaret, a rotating disc 201, fixed to a rotating shaft 203, includes a circular track divided into a number N=20 of sectors, like 202a and 202b. Each sector has a first or second property. In FIG. 2, black sectors 202a represents a first property, and white sectors 202b represents a second property. A number S=5 of sensors 205a-205e are positioned on a fixed element, in proximity above the circular track and output digital signals (bits) B0-B4. The S=5 bits are combined in a digital word 206 that selects one among N=20 digital values. Since the S sensors are equally distributed on the circumference, they can be of usual size of commercially available devices, thus simplifying the encoder design, and reducing its costs.

Villaret, while eliminating the first drawback mentioned above, however still suffers from a limited resolution, due to practical limitations in the size of the sectors. Whenever sectors become smaller, it is necessary to place the sensor at a very short distance from the rotating disc circular track, so that it will be sensible to the closest sector only. If a too large a number N of sectors were used, then this distance would become smaller than the mechanical tolerances of the encoder parts, thus making it inoperable.

It is thus desirable to provide an absolute encoder device of simpler construction, smaller size and lower cost. It would be desirable to provide an absolute encoder having high absolute resolution, wherein commercially available sensors can be used and wherein no additional patterned track is required.

SUMMARY OF THE INVENTION

It is, therefore, an object of the invention to provide an absolute encoder device of simpler construction, smaller size and lower cost but with high absolute resolution, wherein commercially available sensors can be used and wherein no additional patterned track is required.

The object of the invention is to provide a high resolution encoder device having sensors equally distributed on a circular line, so that commercially available sensors can be used. The new encoder device makes use of sensors providing an analog output and includes a memory and processing means in order to obtain a high absolute resolution, not limited by the number of sensors.

The present invention makes use of a number of sensors, preferably equally distributed on a circumference. A rotating disc, having several sections of two different properties on an annular track, is placed so that the sensors can sense the properties of the sections of track in proximity to them. During disc rotation, different sections of the rotating disc come into proximity with each sensor. According to this invention, the sensors' signals take analog values continuously, varying from a minimum value when in proximity to a rotating disc section of a first property to a maximum value when in proximity to a rotating disc section of a second property, and an intermediate value when in proximity to a transition position on the rotating disc.

Before the initial operation of the encoder, in a pre-processing step, characteristics of the encoder are calculated and measured, and stored in the encoder memory. These characteristics are in the form of tables of values and predefined codes that define the sensors' response to the rotating disc track properties.

In a first processing step, the analog value of each sensor signal is normalized. An designates the analog signal value of sensor number n, Hn designates the maximum value of sensor signal n, and Ln designates the minimum value of the sensor signal n. A normalized signal NAn is calculated, for example, by the formula:

$$NAn = [An - (Hn + Ln)/2]/(Hn - Ln)$$

This normalization procedure is used to minimize the influence of the variation of specific sensor characteristics.

In a second processing step, the normalized signals of each sensor are compared to a threshold. The threshold is, for example, the median value between the maximum and minimum values of the normalized signals, and bit values "0" or "1" for each sensor are set according to the comparison result. All bits are then combined in a digital word, in order to create a code number characteristic of the position of the rotating disc. The absolute resolution obtained is then defined by the number of codes generated for a full turn of the encoder rotating disc. For example, in the arrangement described by Villaret, 98 codes can be obtained with 7 sensors.

The pattern of properties of the rotating disc section is designed so that the series of code generated form a Gray code, for which two codes of adjacent sectors differs by one bit only. This means that, during disc rotation, the transition from one code to next one involves one sensor only, i.e. only one sensor normalized signal transits from a value higher/smaller than the threshold to a value smaller/higher than the threshold value. This well known Gray code technique avoids errors and discontinuity in measured position during disc rotation.

To each code obtained at a given position are associated the two numbers of the first changing bit for a rotation of the disc in clockwise and anticlockwise direction from the given position. Since each bit value is determined by the comparison of a sensor analog value with a pre-defined threshold, the associated bit numbers also defines two associated sensors.

The term "zero crossing" positions refers to when the rotating disc positions for which an analog signal is transiting from a value lower, or larger than the threshold value, to a value respectively larger or lower than the threshold value.

During the pre-processing step, there is also recorded for each code the two functions expressing the variations, around the zero cross position, of the normalized signal values of the associated sensors as a function of the rotating disc position. The term "sensor functions" refers to this recorded functions.

Encoder sensors and rotating disc sections properties are designed so that the transition from a minimum value to a maximum value of the normalized signals extends over a range of rotating disc position larger than one sector. Accordingly, within one sector size, a sensor function is monotonous and thus reversible, i.e. the absolute rotating disc position can be determined from the analog value of the normalized signal. The sensor functions can be recorded in the form of a table of values at high resolution, calculated by theory or simulation, or measured using a reference encoder. These functions can also be represented by parametric mathematical functions approximating the normalized signals values, and in this case parameters of these mathematical functions are recorded in the table of values.

In a last processing step, the two normalized signal values of the two sensors associated to the code found are compared, and the normalized signal having the closest value to the threshold is selected. The inversed sensor function, applied to the selected normalized value, thus provides a high absolute resolution position value of the rotating disc.

The result is thus a high resolution absolute encoder, of simple arrangement, since it does not need to be combined with an additional incremental encoder, and since it can be implemented with off the shelf low cost components without the need to design custom semiconductor chip.

Other objects, features and advantages of the present invention will become apparent upon reading the following detailed description in conjunction with the drawings and the claims.

BRIEF DESCRIPTION OF THE DRAWINGS

For a better understanding of the invention, its operating and specific objects attained by its uses, references should be had to accompanying drawings and descriptive matter in which there are illustrated preferred embodiments of the invention.

The invention will now be described in connection with certain preferred embodiments with reference to the following illustrative figures so that it may be more fully understood.

FIG. 8 shows an example of a table that can be used to store in encoder memory the characteristics of an encoder according to this invention;

DETAILED DESCRIPTION OF THE PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
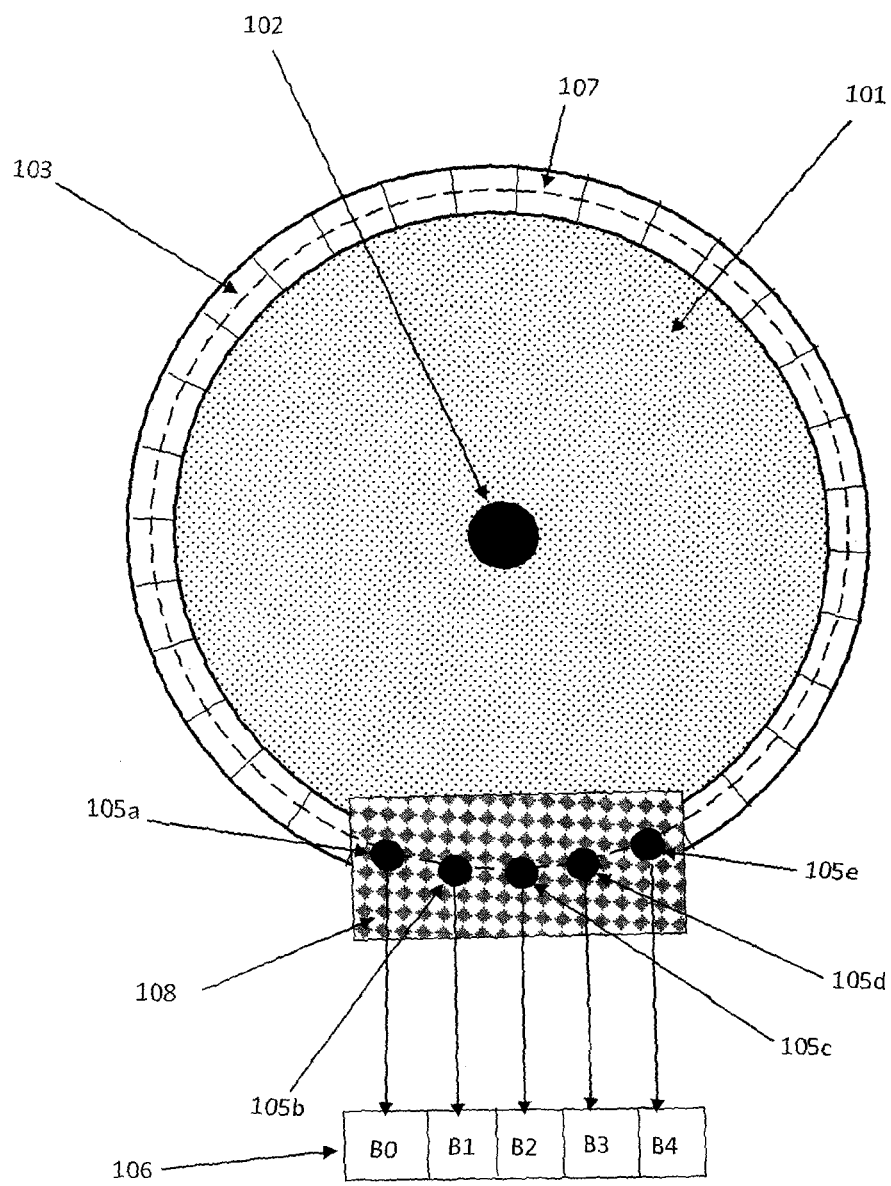
FIG. 1 shows a first prior art absolute encoder where sensors are disposed in one integrated device covering adjacent sectors.
Figure 2:
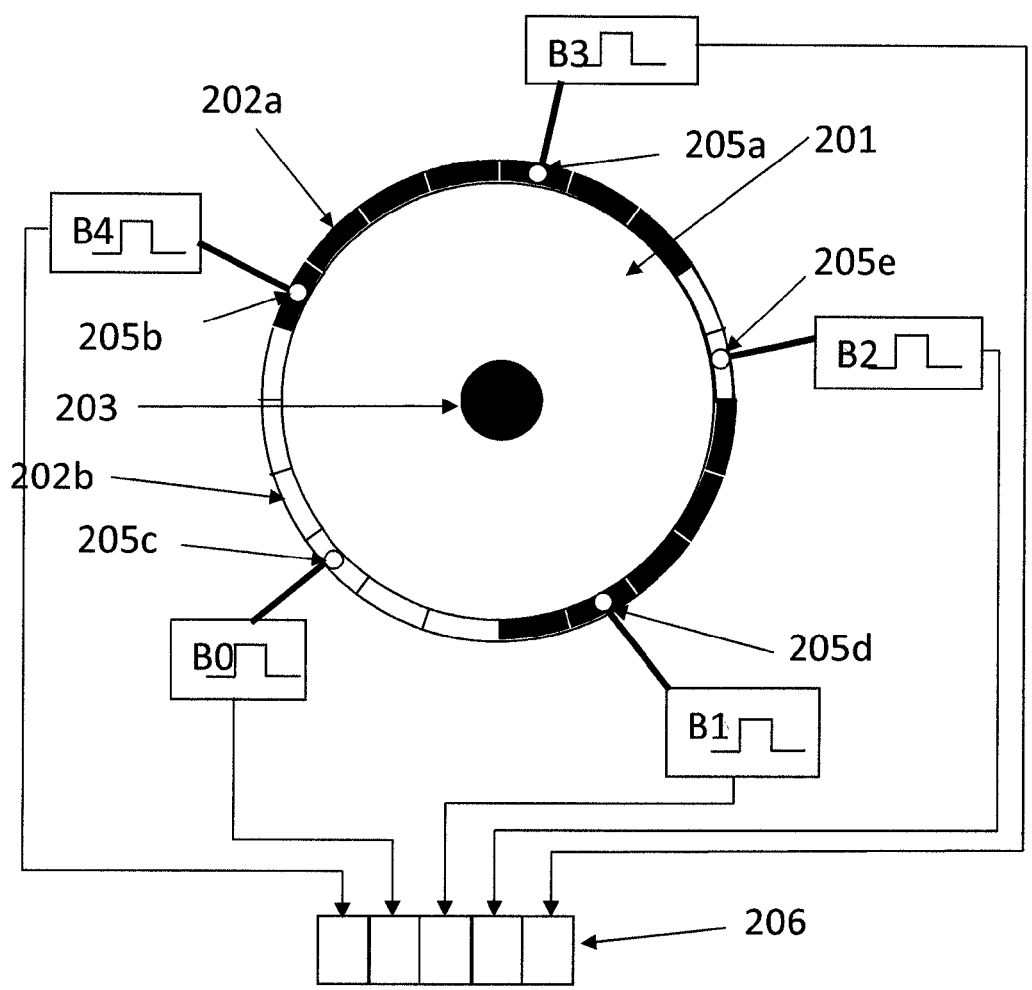
FIG. 2 shows a second prior art absolute encoder according to Villaret (US Published Patent application US2010/0140463), where sensors are equally distributed on circular path and provide digital signals.
Figure 3:
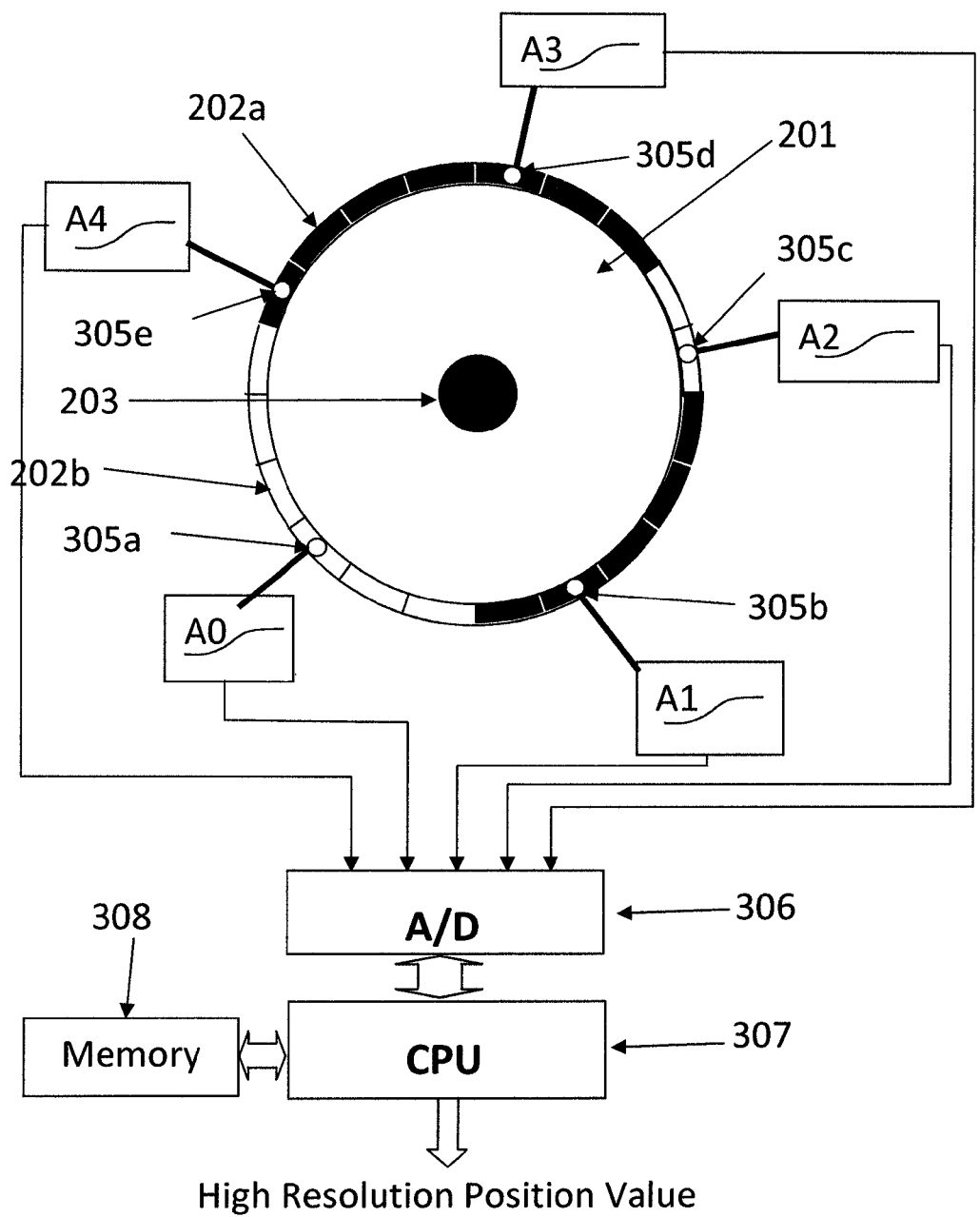
FIG. 3 shows a preferred embodiment according to the present invention, wherein the sensors are equally distributed on a circular path and output an analog signal and processing means are provided to calculate a high resolution absolute position.

In FIG. 3 there is shown an encoder arrangement, according to the present invention, providing an improvement to Villaret, wherein the S=5 sensors 205a-205e of FIG. 2 providing digital signals, are replaced by S=5 analog sensors 305a-305e; the S=5 analog sensors generate analog signals A0-A4. These analog signals are then digitized by an analog to digital converter unit 306, and then transferred to a Processor unit 307. It will be shown that this new arrangement provides high resolution without the need of an additional incremental encoder.

Figure 4:
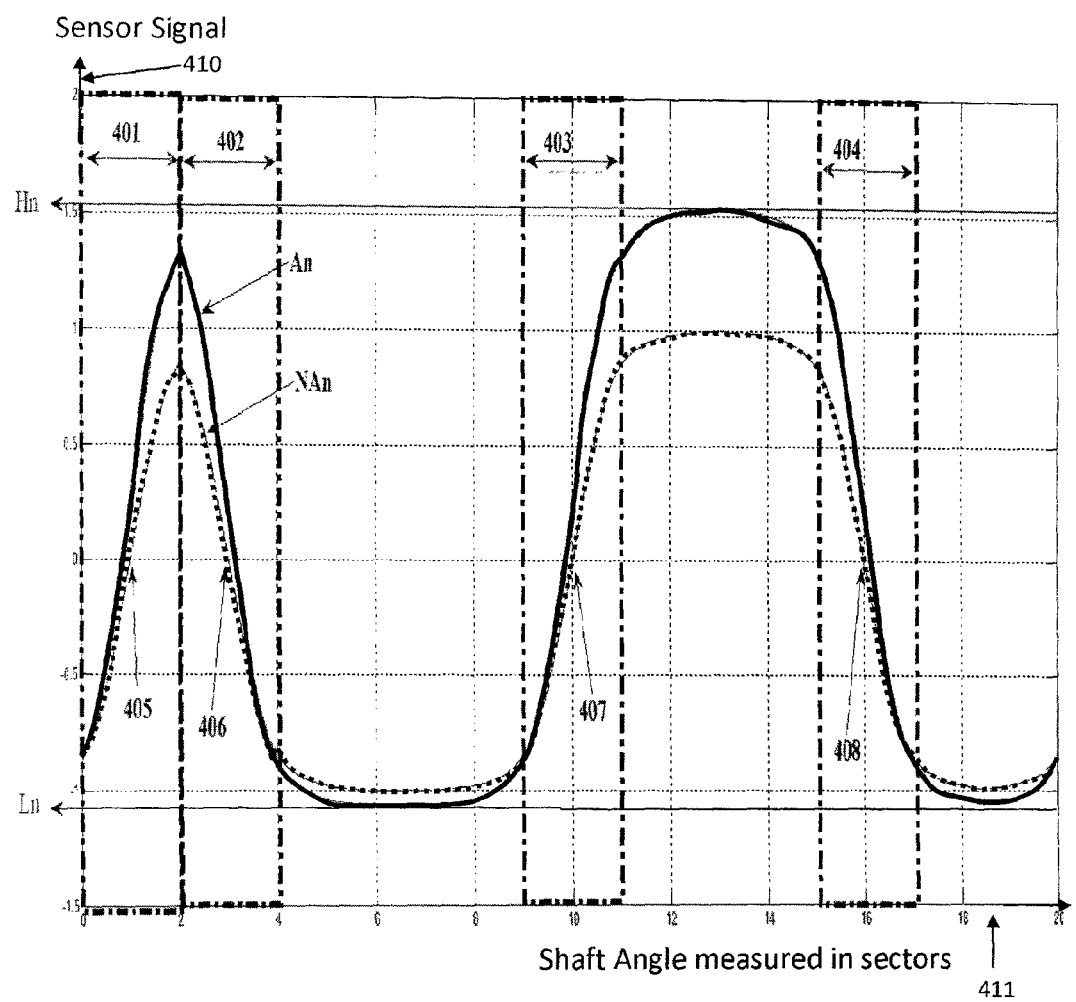
FIG. 4 is a graph, showing the variation of an analog signal An and a correspondent normalized signal Nan.

In FIG. 4 there is shown a graph representing the variation of one analog signal generated by one of the sensors 305a-305e of FIG. 3, shown as the continuous line curve An, output by the sensor number n as a function of the angular position of the rotating disc. The horizontal axis is the rotation angle measured in sector units of sector angular size. In the particular configuration shown in the drawing, there are 20 sectors, so that the rotating disc angular position extends from 0 to 20, measured in sector angular size units. Analog signals An have a maximum value Hn when in proximity of a sector of a first property, and a minimum value Ln when in proximity of a sector of a second property. During rotation of the rotating disc, sectors of different properties approach or move farther from the sensor, so that the analog output generated by sensor takes intermediate values depending on its distances from the different rotating disc sectors, and in good approximation, depending on its distances from the two closest sectors.

Since sensors are distributed equally on a circular track, all signals Sn of all sensors have a similar shape, shifted on the horizontal axis by a value representing their relative position on the circular track. This is shown in FIG. 5, where the 5 sensors normalized signals NA1-NA5, indicated by arrows 501-505, are plotted on the same graph.

Figure 5:
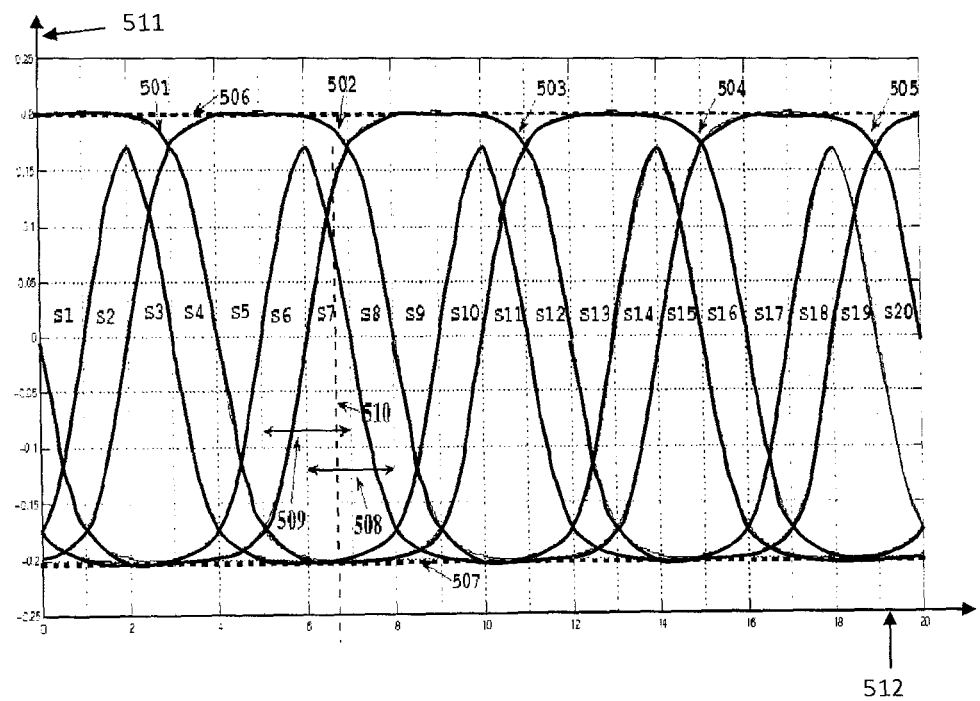
FIG. 5 is a graph, showing the variations, for one turn rotation of the rotating disc, of the normalized signals for an absolute encoder according to the present invention, wherein 5 sensors are used.
Figure 6:
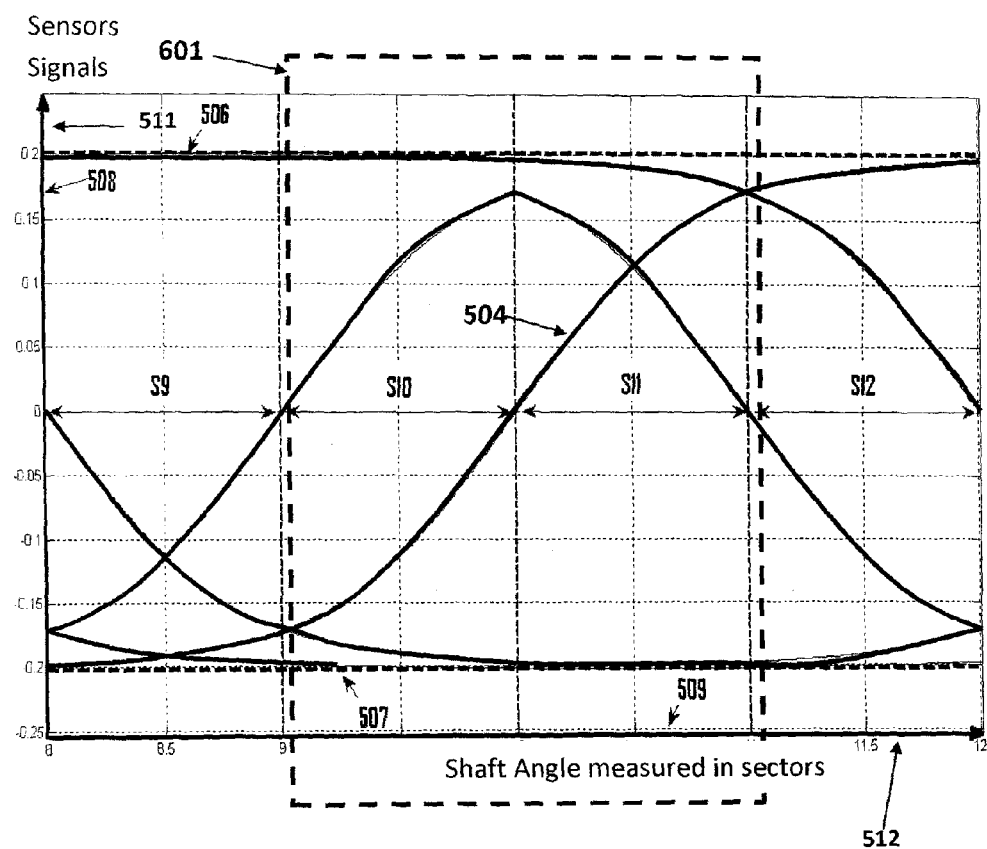
FIG. 6 is an enlarged view of FIG. 5.

FIG. 6 shows an enlarged view of FIG. 5.

Figure 7:
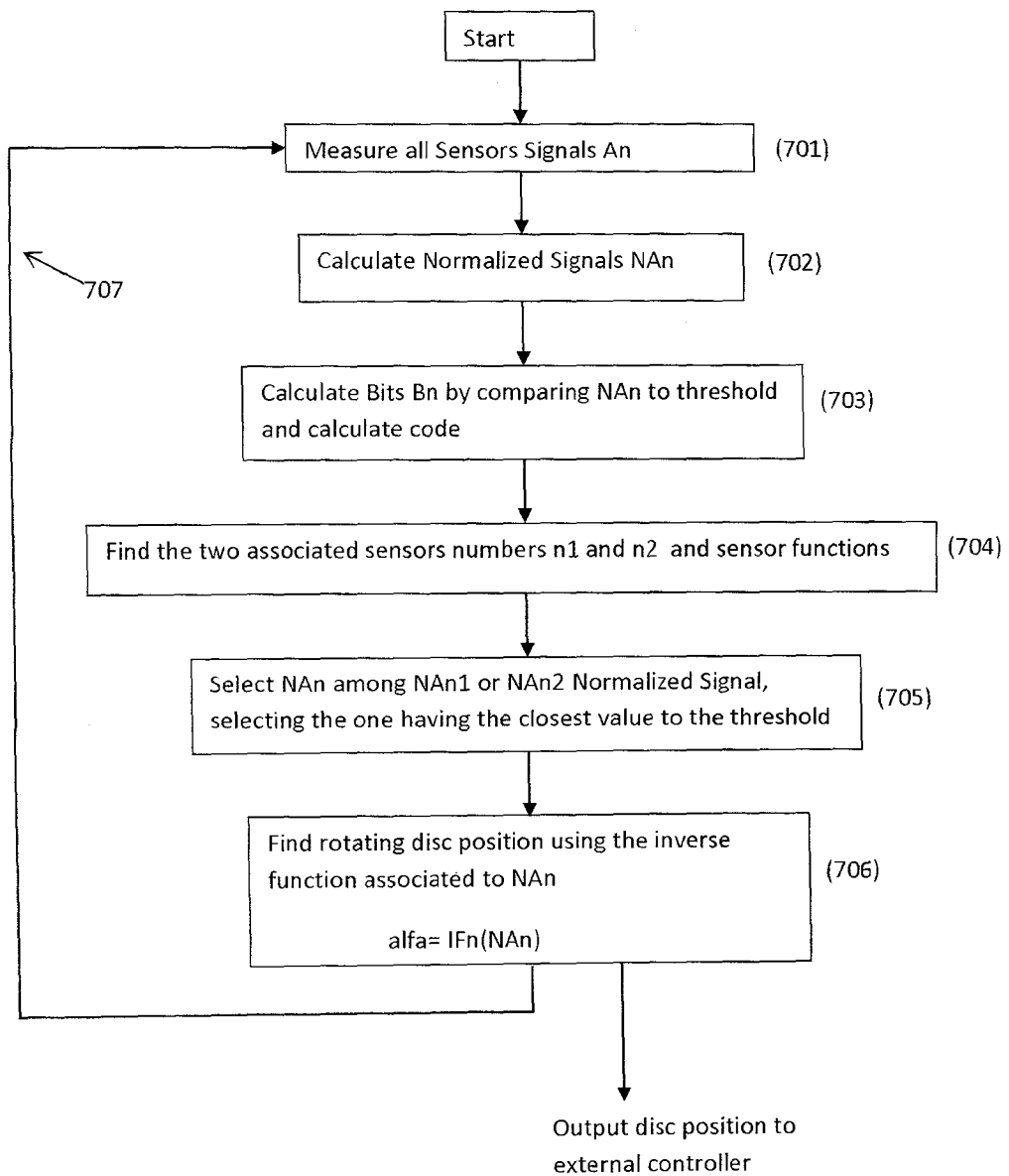
FIG. 7 is a block diagram, showing and summarizing the sequence of processing steps used to calculate a high resolution rotating disc absolute position.

FIG. 7 shows the sequence of processing steps used to calculate a high resolution absolute position of the rotating disc.

In the first step shown in block 701, the N electric signals issued by sensors are measured and their analog values are transferred to the CPU (307 of FIG. 3) by means of analog to digital converters 306 of FIG. 3.

In step (702), these analog signals are normalized, by reference to their maximum and minimum values Hn and Ln. Referring to FIG. 4, the analog value of one analog signal as been plotted along the vertical axis (410) as a function of the rotating disc position, measured in sector, and plotted along the horizontal axis (411). For the particular example shown in FIG. 4, the normalized signal NAn (dotted line) has been calculated from the analog signal An (plain line) by the equation:

$$NAn = [An - (Hn + Ln)/2]/(Hn - Ln)$$

The maximum and minimum values Hn and Ln, have been recorded in the encoder memory (308 of FIG. 3) in a pre-processing step, for example during encoder manufacture. The purpose of the normalized signal is to obtain a signal value independent of the sensitivity of the sensor, as well as independent of tolerances in the encoder fabrication, causing small deviations of the distance of the sensor from the nominal value of design. The normalized signal NAn, according to this particular normalization equation, is then in the range values [−1, +1]. Signal NAn, is now, in a very good approximation, depending only on the physical laws of the sensitivity of the sensor to the property of the sectors.

It must be understood that various normalizing formulae can be used, and the particular function described here is just one example.

Referring again to FIG. 4, the function representing the variation of the normalized signal NAn (dotted line) has a number of zero crossing values. In the particular embodiment described here, there are four zero crossing, at sector positions 1, 3, 10 and 16, indicated in FIG. 4 by labels 405-408. Consider now the function representing the signal variation with the rotating disc position for all ranges of rotating disc position values within one sector angular size from a zero cross rotating disc position. Further below, the term "range of interest" (or "ROI") shall refer to a range of values of the rotating disc position. An ROI has thus an angular size which is at least twice the size of a sector.

For illustration, the ROIs defined by the normalized signal shown in FIG. 4 are marked, included in dashed rectangles and labeled 401-404. Considering now the function representing the normalized signal Nan within an ROI surrounding the zero cross position of NAn, it can be seen that this function is monotonous, i.e. continuously increasing or decreasing.

This can be seen in more details in FIG. 6 where the signal NA4 (504) of sensor number 4 can be seen monotonous in the ROI 601 extending over sectors S10 and S11. This property is ensured by design, setting the sensors at a sufficient distance from the rotating disc.

For each sector position it is possible to associate the two ROIs surrounding the two closest zero crossings, and the two normalized signals for which the zero crossing occurs. This can be seen in FIG. 5, where the N=5 normalized signals are plotted on the same graph. The amplitude of the signals is plotted in the direction of the vertical axis (511) as a function of the sector position plotted along the horizontal axis (512). If, for example, the sector position, indicated by a dashed line and label 510, two ROIs 508 and 509 are associated, surrounding the zero crossing of normalized signals NA5 (505) and NA3 (503) calculated from signals of sensors number 5 and 3.

In processing step (703) of FIG. 7, for a given rotating disc position, a code number (or code) is calculated, characteristic of the sector position of the rotating disc. In order to create this code number, the N=5 normalized signals are compared to a threshold, preferably being the median value between the maximum and minimum value of these signals. For the normalized signals 501-505 shown in FIG. 5, this threshold has been set to a zero value. Whenever a signal value NAn is greater than the threshold value, a value 1 is set to a bit Bn, otherwise a value 0 is set. The N bits Bn are then combined in a word, creating a code characteristic of the sector position of the rotating disc. This is illustrated in the following table, in which the code for the rotating disc position indicated by a dash line and label 510 is calculated.

| [70] Signal NAn | [69] Bit value | [68] Value | [67] Code (in decimal value) |
|---|---|---|---|
| [74] NAn1 (501) | [73] 0 | [72] < 0 | [71] 14 |
| [78] NAn2 (502) | [77] 1 | [76] > 0 | [75] |
| [82] NAn3 (503) | [81] 1 | [80] > 0 | [79] |
| [86] NAn4 (504) | [85] 1 | [84] > 0 | [83] |
| [90] NAn5 (505) | [89] 0 | [88] < 0 | [87] |

The pattern of rotating disc sectors properties is designed so that each code is characteristic of one unique sector. The pattern can be found according to the Villaret patent application. Code value changes each time a bit value is changed, and thus each time a zero cross of a normalized signal occurs, so that each sector extends in a range of rotating disc positions delimited by two positions at which a zero cross of a normalized signal occurs. These sectors are indicated in FIG. 5 by the S1-S20 labels. For each rotating disc position, the bits values B1-Bn are evaluated and the corresponding code is calculated.

As mentioned above, the characteristics of the sensors' responses to the rotating disc position are recorded in encoder memory (308 of FIG. 3). These characteristics can be calculated or measured in a pre-processing step, executed during encoder design, and may be calibrated during encoder manufacture.

These characteristics include the two sensor number and two sensor functions in the ROIs associated with each code. The sensor functions represent the sensors normalized analog signal variation as a function of rotating disc position in the two ROIs associated to the corresponding sector. Preferably, the sensor functions will be stored in an inverted form, so that an inverted sensor function will associate a rotating disc position to each value of the normalized signal value.

The inverted sensor functions can be recorded in a table of values, and the correspondence between a normalized signal value and a rotating disc position can be calculated by known interpolation techniques.

The inverted sensor functions can also be approximated by a mathematical function, and in this case the parameters of this function are recorded in the pre-processing step, instead of the actual values.

Additionally, the maximum and minimum values of each sensor Hn and Ln are recorded in the encoder memory (308 of FIG. 3) during the pre-processing step.

In FIG. 8 there is shown an example of tables that can be used to store in encoder memory the characteristics of an encoder, according to the invention.

Table 801 is a record of the maximum and minimum values of each analog signal. This table is used for the calculation of the normalized signals in step 703 of FIG. 7.

Table 802, is a table that associates with each code two sensors and two sensor functions. CCW or CW zero crossing sensor refer to the number of the first sensor for which a zero crossing of normalized signal occurs if the rotating disc were turning in the Counter Clockwise or Clockwise direction respectively. CCW or CW sensor function refer to pointers to the table of values recorded for the corresponding sensor functions. As can be seen, for the embodiment of FIG. 3 with 5 sensors and 20 sectors, 40 tables representing the inversed sensor functions are recorded in the said pre-processing step and stored in encoder memory 308.

In processing step 704 of FIG. 7, two sensor numbers n1 and n2, and two associated inversed sensor functions IF1 and IF2 associated to the code found in processing step 703 are found, using the pre-recorded characteristics, for example using table 802 of FIG. 8. For example, if the found code is 6, the two sensors associated are found in the columns ccw zero crossing sensor number and ccw zero crossing sensor number with values n1=3, n2=5, and two inversed functions IF1 and IF2 are pointed at by the pointers Pt1_6 and Pt2_6 found in the columns CCW sensor function pointer and "CW sensor function pointer.

In processing step 705 of FIG. 7, the two values NAn1 and NAn2 of the normalized signals of sensors n1 and n2 are compared to the threshold. The signal NAn having the closest value to the threshold is selected, n=n1 or n=n2, depending on comparison result. One inversed sensor function IFn (IFn1 or IFn2) is selected, pointed at by pointer of the CCW or CW Sensor function column, if CCW or CW zero cross sensor number was selected respectively.

In the final processing step 706, the high resolution rotating disc position alfa is then found by applying the recorded inversed sensor function IFn to the normalized signal NAn, i.e. alfa=IFn(NAn)

The found high resolution rotating disc position can then be transmitted for use by an external controller.

The processing steps 701 to 706 are executed at a high rate in an endless loop, shown by arrow line 707.

The high resolution absolute encoder of this invention is not dependent of the type of sensor and rotating disc material properties. It can be implemented as an optical encoder, wherein the encoder properties are transparency or opacity, or it can be implemented as a magnetic encoder, wherein permanent magnets of different orientation are fixed to the rotating disc, and magnetic field sensors, such as Hall Effect sensors are used.

Figure 9:
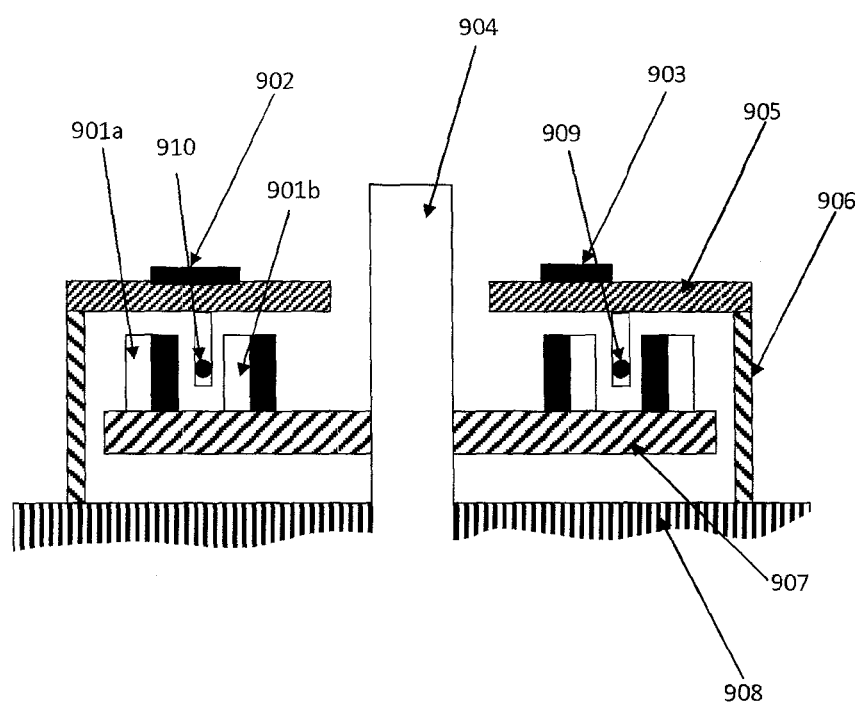
FIG. 9 shows a preferred embodiment of the encoder, according to this invention, using permanent magnets and magnetic sensors.

A cross-section of a preferred embodiment using magnetic properties and magnetic sensors (Hall Effect sensors) is shown in FIG. 9. This embodiment has the property of having a low sensitivity to the mounting precision of the rotating disc. The cross-section is in a plane including the axis of rotation.

The encoder is mounted on the flange 908 of a motor (not shown) that rotates a shaft 904.

A rotating disc includes a structure disc 907 and two annular rings of permanent magnets 901a and 901b fixed to the structure disc 907. The permanent magnets of the two magnet rings 901a-901b generate a radial magnetic field between them. Various angular sections of these magnet rings generate different inward or outward magnetic field direction, according to a pre-defined pattern. The rotating disc is fixed to shaft 904 by means of its structure disc 907.

A number N of Hall Effect sensors like 909 and 910 are static and placed on a circular line between the two magnet rings. This circular line is designed to be precisely the median line between the two magnet rings. Also, the axial position of this circular line is precisely set at mid-height of the magnet rings. The N Hall effect sensors are distributed at equal angular distances on this circular line, and are fixed to a printed circuit board 905. The printed circuit board 905 is fixed to the motor flange 908 by means of a cylindrical part 906. CPU chip 902 and memory chip 903 are shown soldered on printed circuit board 905. Other electronic components necessary for the electronic functions of the encoder are also soldered to the printed circuit board.

In this arrangement, the Hall Effect sensors output an electric signal proportional to the amplitude of the magnetic field, and having a sign depending on the orientation inward or outward of the magnetic field. Upon rotation of the rotating disc, the magnetic field changes direction progressively when the rotating disc is moving from an inward/outward oriented ring section to an outward/inward oriented section. The changing rate can be calibrated by design, setting the geometrical dimensions of the magnet rings. As explained previously, this rate is set so that the Hall sensor signal will progressively change from a minimum/maximum value to a maximum/minimum value over an angular range larger than one sector.

The preferred embodiment described here has the advantage of not being sensitive to the mounting precision of the encoder. This is due to the median position of the Hall sensors, for which the function representing the magnetic field strength as a function of space coordinates has a local extreme value (maximum or minimum), and thus a zero gradient.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A high resolution encoder device to measure the angular position of a rotating element, comprising:
   a) a rotating disc fixed to the rotating element, said rotating disc including a circular track having sections of a first property and sections of a second property according to a given pattern;

b) a plurality of fixed sensors positioned in proximity to said circular track, each sensor outputting an electrical signal having a maximal value when in proximity to a section of the circular track of said first property and a minimum value when in proximity to a section of the circular track of said second property, and continuously and monotonously changing intermediate values in between said maximal value and said minimum value when said rotating disc rotates from a position for which said sensor is in proximity to a section of said first or said second property to a position for which said sensor is in proximity to a section of the other property;

c) a memory to store pre-recorded encoder characteristics; and, d) processing means to process values of said electrical signals of said sensors, and wherein, in a first processing step, a bit is set for each sensor as a result of a comparison of said electrical signal of a respective sensor to a pre-defined threshold stored in said memory, and all bits of all sensors are combined in a word, the value of this word defining a code, wherein two electrical signals are associated to each code value, wherein, in a second processing step, said two electrical signals associated to said code are compared, and an electrical signal having the closest value to the threshold is selected, and wherein, in a third processing step, a high resolution angular position of the rotating disc is deduced from the code and said selected electrical signal.

2. The encoder of claim 1, wherein sections of said first and second property sectors include permanent magnets generating magnetic field in two different directions, and wherein said sensors are sensible to magnetic field direction.

3. The encoder of claim 2, wherein said circular track of the rotating disc includes two concentric rows of permanent magnets, creating inward and outward radial magnetic fields and said sensors being positioned in a median line between said two concentric rows.

4. The encoder of claim 1, wherein said sensors are equally distributed on a circumference of a static part, and said rotating disc is placed so that the sensors can sense the property of the section of track in proximity to them, wherein said sensors provide an analog output and said memory stores characteristics of said encoder device and said processing means processes analog output signals of each sensor.

5. The encoder of claim 4, further comprising an analog to digital converter unit configured to digitize signals of said analog output from said sensors and then to transfer said digitized analog output signals to said processing means.

6. The encoder of claim 5, wherein output signals of said different ones of said sensors comprise similar shapes respectively, shifted by a value representing their relative position on said circular track.

7. The encoder of claim 6, wherein said circular track comprises annular rings of permanent magnets generating a radial magnetic field between them, and wherein said sensors comprise Hall Effect sensors placed on a circular line between said annular rings of permanent magnets.

8. The encoder of claim 5, wherein said circular track comprises annular rings of permanent magnets generating a radial magnetic field between them, and wherein said sensors comprise Hall Effect sensors placed on a circular line between said annular rings of permanent magnets.

9. The encoder of claim 4, wherein said sensors are distributed equally on said circular track.

10. The encoder of claim 9, wherein output signals of said different ones of said sensors comprise similar shapes respectively, shifted by a value representing their relative position on said circular annular track.

11. The encoder of claim 4, wherein said circular track comprises annular rings of permanent magnets generating a radial magnetic field between them, and wherein said sensors comprise Hall Effect sensors placed on a circular line between said annular rings of permanent magnets.

* * * * *